(12) United States Patent
Elseviers et al.

(10) Patent No.: US 8,394,171 B2
(45) Date of Patent: Mar. 12, 2013

(54) METHODS FOR CONTROLLING IMPURITY BUILDUP ON ADSORBENT FOR PRESSURE SWING ADSORPTION PROCESSES

(75) Inventors: Wim Frans Elseviers, Oost-Vlaanderen (BE); Stephan Laux, Antwerp (BE)

(73) Assignee: UOP LLC, Des Plaines, IL (US)

( * ) Notice: Subject to any disclaimer, the term of this patent is extended or adjusted under 35 U.S.C. 154(b) by 188 days.

(21) Appl. No.: 13/050,353

(22) Filed: Mar. 17, 2011

(65) Prior Publication Data
US 2012/0234165 A1 Sep. 20, 2012

(51) Int. Cl.
*B01D 53/047* (2006.01)
(52) U.S. Cl. ............ 95/11; 95/12; 95/100; 95/103
(58) Field of Classification Search ......... 95/8, 11, 95/12, 96, 100, 103; 96/111
See application file for complete search history.

(56) References Cited

U.S. PATENT DOCUMENTS

| | | | |
|---|---|---|---|
| 4,693,730 A | 9/1987 | Miller et al. | |
| 5,529,607 A * | 6/1996 | Tan | 95/12 |
| 6,277,174 B1 * | 8/2001 | Neu et al. | 95/12 |
| 7,011,693 B2 | 3/2006 | Mallavarapu et al. | |
| 7,025,801 B2 * | 4/2006 | Monereau | 95/8 |
| 7,399,341 B2 | 7/2008 | Patel et al. | |
| 7,438,079 B2 | 10/2008 | Cohen et al. | |
| 7,846,237 B2 * | 12/2010 | Wright et al. | 95/11 |
| 2002/0112606 A1 * | 8/2002 | Ackley et al. | 95/96 |
| 2010/0242722 A1 | 9/2010 | Belanger et al. | |
| 2010/0294127 A1 * | 11/2010 | Dolensky | 95/11 |

OTHER PUBLICATIONS

Khajuria, Harish, et al. "Dynamic Modeling and Explicit/Multi-Parametric MPC Control of Pressure Swing Adsorption Systems," Journal of Process Control, 2010; ISSN: 09591524; DOI: 10.1016/j.jprocont.2010.10.021.
Cassidy, R. T. "Polybed Pressure-Swing Adsorption Hydrogen Processnig," Union Carbide Corporation, Linde Division/EP&P, Tarrytown, NY 10591; 108th ACS Natl. Meet. Div. Ind. Eng. Chem. Adsorption Ion Exchange Synth. Zeolites' Symp. (San Franc. Aug. 25-26, 1980) ACS Symp. Ser. N. 135 247-59 (1980), Aug. 25, 1980.
Shakocius, Aaron "Improved Process Control and Data Acquisition System for Studying Containment Behavior in the 99% Purity Molecular Sieve Oxygen Concentrator," Proceedings—Annual Safe Symposium (Survival and Flight Equipment Association), N. 29, p. 113-116, 1991, Proc. 29 Annu. SAFE Symp; Conference Proceedings of the 29th Anual SAFE Symposium, Nov. 11, 1991-Nov. 13, 1991; Publisher: Publ. by Survival & Flight Equipment Assoc.

* cited by examiner

*Primary Examiner* — Frank Lawrence, Jr.
(74) *Attorney, Agent, or Firm* — Mark Goldberg (57) ABSTRACT

Embodiments of methods for controlling impurity buildup on adsorbent for a pressure swing adsorption (PSA) process are provided. The method comprises the steps of operating the PSA process including performing (a) a first depressurizing equalization step, and (b) a providing purge step. Impurities are sensed in an effluent from the PSA process. If the impurities sensed in the effluent have reached a predetermined upper impurity level, then the PSA process is operated including performing (b) and not (a).

24 Claims, 5 Drawing Sheets

| STEP | 1 | 2 | 3 | 4 | 5 | 6 | 7 | 8 | 9 | 10 | 11 | 12 |
|---|---|---|---|---|---|---|---|---|---|---|---|---|
| A | ADSORPTION | | | EQ | HOLD | PP | BLOW DOWN | | PURGE | EQ+REP | REPRESSURIZATION | PP |
| B | BLOW DOWN | | PURGE | EQ+REP | REPRESSURIZATION | | ADSORPTION | | | EQ | HOLD | |
| C | EQ | HOLD | PP | BLOW DOWN | | PURGE | EQ+REP | REPRESSURIZATION | | ADSORPTION | | |
| D | EQ+REP | REPRESSURIZATION | | ADSORPTION | | | EQ | HOLD | PP | BLOW DOWN | | PURGE |
| TIME (SEC) | 0 | 15 | 45 | 135 | 150 | 180 | 270 | 285 | 315 | 405 | 420 | 450 | 540 |

FIG. 5

| STEP | 1 | 2 | 3 | 4 | 5 | 6 | 7 | 8 | 9 | 10 | 11 | 12 |
|---|---|---|---|---|---|---|---|---|---|---|---|---|
| A | ADSORPTION | | | HOLD | | PP | BLOW DOWN | | PURGE | REPRESSURIZATION | | PP |
| B | BLOW DOWN | PURGE | | REPRESSURIZATION | | | ADSORPTION | | | HOLD | | |
| C | HOLD | | PP | BLOW DOWN | | PURGE | REPRESSURIZATION | | | ADSORPTION | | |
| D | REPRESSURIZATION | | | ADSORPTION | | | HOLD | | PP | BLOW DOWN | | PURGE |
| TIME (SEC) | 0 | 15 | 45 | 135 | 150 | 180 | 270 | 285 | 315 | 405 | 420 | 450 | 540 |

METHODS FOR CONTROLLING IMPURITY BUILDUP ON ADSORBENT FOR PRESSURE SWING ADSORPTION PROCESSES

FIELD OF THE INVENTION

The present invention relates generally to methods for pressure swing adsorption, and more particularly relates to methods for controlling impurity buildup on adsorbent for pressure swing adsorption processes.

BACKGROUND OF THE INVENTION

A pressure swing adsorption (PSA) process provides an efficient and economical means for separating a multicomponent feed gas stream containing at least two gaseous components having different adsorption characteristics to produce a high purity product gas. The PSA process is based on the principle of selectively adsorbing impurities onto adsorbent materials at a relatively high pressure to form the high purity product gas, and desorbing the impurities from the adsorbent materials at relatively low pressure to regenerate the adsorbent materials and to form a secondary stream containing the impurities called the tail gas stream. The multicomponent feed gas is typically fed to one of a plurality of fixed-bed adsorption units. The fixed-bed adsorption units each contain layers of different adsorbent materials where the lower layer or layers are filled with weaker adsorbent materials, e.g., relatively low affinity for adsorbing a gaseous component, and the upper layer or layers are filled with stronger adsorbent materials, e.g., relatively high affinity for adsorbing a gaseous component.

The multiple fixed-bed adsorption units cooperatively operate in a staggered sequence to produce constant feed, product, and tail gas flows. Regardless of the number of fixed-bed adsorption units, the PSA process follows a five-step pressure-swing cycle including an adsorption step, a co-current depressurization step, a counter-current depressurization step, a purge step, and a repressurization step. During the adsorption step, the multicomponent feed gas enters a lower portion of the fixed-bed adsorption unit at a high-pressure, and as the feed gas rises in the unit, the impurities are adsorbed in the various layers of the adsorbent materials depending upon their respective adsorption selectivity to form the high purity product gas. That is, stronger adsorbent impurities are adsorbed in the lower layers of the fixed-bed containing the weaker adsorbent materials, and the weaker adsorbent impurities are adsorbed in the upper layers containing the stronger adsorbent materials. The co-current depressurization, counter-current depressurization and purge steps decrease the pressure in the fixed-bed adsorption unit and purge the unit with high purity gas from the product or co-current depressurization steps, respectively, to remove the impurities and regenerate the adsorption materials. The repressurization step increases the pressure in the fixed-bed adsorption unit with either feed gas or product gas in preparation for the next adsorption step.

Unfortunately, sometimes the PSA process is operated such that the high purity product gas is produced at a lower than target level of purity (e.g. product gas containing more impurities). For example, the PSA process may be designed to remove impurities from a hydrogen rich stream to produce a high purity product stream having about 99.9 mole % of hydrogen. However, if the process is not monitored or if such a high purity product gas is not necessarily needed for subsequent downstream processes, for example, the high purity product stream may have about 99.5, 98, 97, or even 95 mole % of hydrogen. Because the high purity product gas is used to regenerate the adsorbent materials contained in the various layers of the fixed-bed, a high purity product gas at lower than target levels of purity may not sufficiently regenerated the adsorbent materials during the depressurization and purge steps. If the PSA process is allowed to operate for an extended period of time under these conditions, irreversible adsorption (e.g. permanent adsorption) can occur causing a loss of activity of the adsorbent material. Specifically, some of the strongly adsorbent impurities, which by design are intended to adsorb onto the weaker adsorbent materials contained in the lower layers of the fixed-bed, may be adsorbed onto the stronger adsorbent material contained in the upper layers of the fixed-bed. When this occurs, the strongly adsorbent impurities may not sufficiently desorb from the stronger adsorbent materials during the depressurization and purge steps, causing impurity buildup on the adsorbent material and loss of adsorption activity. When the adsorbent materials lose activity, they need to be replaced, which is expensive and time consuming.

Accordingly, it is desirable to provide methods for controlling impurity buildup on adsorbent for PSA processes. Furthermore, other desirable features and characteristics of the present invention will become apparent from the subsequent Detailed Description of the Invention and the appended Claims, when taken in conjunction with the accompanying drawings and this Background of the Invention.

SUMMARY OF THE INVENTION

Methods for controlling impurity buildup on adsorbent for a pressure swing adsorption (PSA) process are provided herein. In accordance with an exemplary embodiment, the adsorbent is contained in a plurality of adsorption units including a first adsorption unit, a second adsorption unit, and a third adsorption unit. The method comprises the steps of operating the PSA process in a normal mode comprising a first depressurizing equalization step and a providing purge step. The first depressurizing equalization step causes a first amount of gas to be fluidly communicated from the first adsorption unit that is at a pressurized condition to the second adsorption unit to equalize pressure between the first and second adsorption units. The providing purge step causes a second amount of gas to be fluidly communicated from the first adsorption unit to purge the third adsorption unit for removal of impurities from the adsorbent in the third adsorption unit. The impurities in an effluent from the PSA process are sensed. If the impurities sensed in the effluent have reached a predetermined upper impurity level, the PSA process is operated in a high purge mode. The PSA process operating in the high purge mode comprises a high providing purge step and excluding the first depressurizing equalization step to increase an available amount of gas for the high providing purge step. The high providing purge step causes a third amount of gas to be fluidly communicated from the first adsorption unit to purge another of the plurality of adsorption units. The third amount of gas is greater than the second amount of gas for enhanced removal of the impurities from the adsorbent in the other of the plurality of adsorption units.

In accordance with another exemplary embodiment, a method for controlling impurity buildup on adsorbent for a PSA process is provided. The method comprises the steps of operating the PSA process including performing (a) one or more depressurizing equalization steps, and (b) a providing purge step. Impurities are sensed in an effluent from the PSA process. If the impurities sensed in the effluent have reached a predetermined upper impurity level, then the PSA process is operated including performing (b) and not (a).

In accordance with another exemplary embodiment, a method for controlling impurity buildup on adsorbent for a PSA process is provided. The method comprises the steps of operating the PSA process in a normal mode comprising causing a first amount of gas to be fluidly communicated from a first adsorption unit to a second adsorption unit to equalize pressure between the first and second adsorption units in one or more pressure equalization steps. A second amount of gas is caused to be fluidly communicated from the first adsorption unit to a third adsorption unit for purging impurities from the adsorbent in the third adsorption unit. Impurities are sensed in an effluent from the PSA process. If the impurities sensed in the effluent have reached a predetermined upper impurity level, then the PSA process is operated in a high rate purge mode comprising blocking or limiting fluid communication with the first adsorption unit such that the first amount of gas is not or not completely fluidly communicated from the first adsorption unit to equalize pressure with the second adsorption unit. A third amount of gas is caused to be fluidly communicated from the first adsorption unit to the third absorption unit. The third amount of gas is greater than the second amount of gas for enhancing purging of the impurities from the adsorbent in the third absorption unit.

BRIEF DESCRIPTION OF THE DRAWINGS

Embodiments of the present invention will hereinafter be described in conjunction with the following drawing figures, wherein like numerals denote like elements, and wherein.

DETAILED DESCRIPTION

The following Detailed Description is merely exemplary in nature and is not intended to limit the invention or the application and uses of the invention. Furthermore, there is no intention to be bound by any theory presented in the preceding Background of the Invention or the following Detailed Description.

Various embodiments contemplated herein relate to methods for controlling impurity buildup on adsorbent for pressure swing adsorption (PSA) processes. The adsorbent is contained in a plurality of adsorption units including a first adsorption unit, a second adsorption unit, and a third adsorption unit. The adsorption units cooperatively operate in a staggered sequence comprising an adsorption step, a co-current depressurization step, a counter-current depressurization step, a purge step, and a repressurization step. The adsorption step is for adsorbing at least one selectively-adsorbable impurity from a multicomponent feed stream at a relatively high pressure onto the adsorbent to form a high purity product stream. The term "impurity" denotes the undesirable component or components that are adsorbed onto the adsorbent in the process. The depressurization and purge steps are for depressurizing and purging the adsorption units to remove the impurities from the adsorbent and to regenerate the adsorbent. The repressurization step is for repressurizing the adsorption units with product or feed gas for the next adsorption step.

When the PSA process is operating in a normal mode, it preferably produces a high purity product gas near or below its targeted low-impurity level (e.g. about 10 ppm of CO or methane) during the adsorption step. The subsequent co-current depressurization step comprises at least one depressurizing equalization step (e.g., multiple depressurizing equalization steps can be used when the PSA system comprises more than three adsorption units) and a providing purge step. In particular, the depressurizing equalization step causes an amount of gas that is almost as pure (e.g. about 15-25 ppm of CO or methane) as the high purity product gas to be fluidly communicated from the first adsorption unit that is at a pressurized condition to the second adsorption unit, which is at a lower pressure, to equalize pressure between the first and second adsorption units. The providing purge step causes a second amount of gas that is high purity gas (e.g. about 25-100 ppm of CO or methane) to be fluidly communicated from the first adsorption unit to the third adsorption unit, which is currently undergoing the purge step, to purge impurities from the adsorbent in the third adsorption unit.

In an exemplary embodiment, the impurities in an effluent from the PSA process are measured either continuously or repeatedly using a purity analyzer (e.g. a sensing arrangement cooperatively configured with a control unit). The effluent may be the product gas stream, or more preferably a depressurization gas stream from one or more of the co-current depressurizing steps. In at least one embodiment, the depressurization gas stream has a slightly higher impurity level than the product gas stream and therefore, may be easier to measure for impurities. If the measured impurities in the effluent have reached a predetermined upper impurity level that is greater than the targeted low-impurity level, then the PSA process responds by changing to a high purge mode. In the high purge mode, the PSA process still operates using the staggered sequence comprising an adsorption step, a co-current depressurization step, a counter-current depressurization step, a purge step, and a repressurization step. However, the co-current depressurization step is modified by excluding at least one depressurization equalization step (e.g. one, two, or more equalization steps may be excluded for PSA processes using two or more equalization steps). As such, the amount of high purity gas that would otherwise be fluidly communicated in the normal mode from the first adsorption unit at a high-pressure to the second adsorption unit at a lower pressure remains in the first adsorption unit as additional high purity purging gas, and preferably to maintain the high pressure therein. Thus, when the first adsorption unit advances to the providing purge step, more high purity gas is available in the first adsorption unit for being fluidly communicated to purge the third adsorption unit. Using more high purity gas to purge the third adsorption unit enhances removal of the impurities that may be built up on the adsorbent. In an exemplary embodiment, when the measured impurities in the effluent have reached a predetermined lower impurity level that is less than the targeted low-impurity level, the PSA process responds by changing from operating in the high purge mode to operating in the normal mode.

Figure 1:
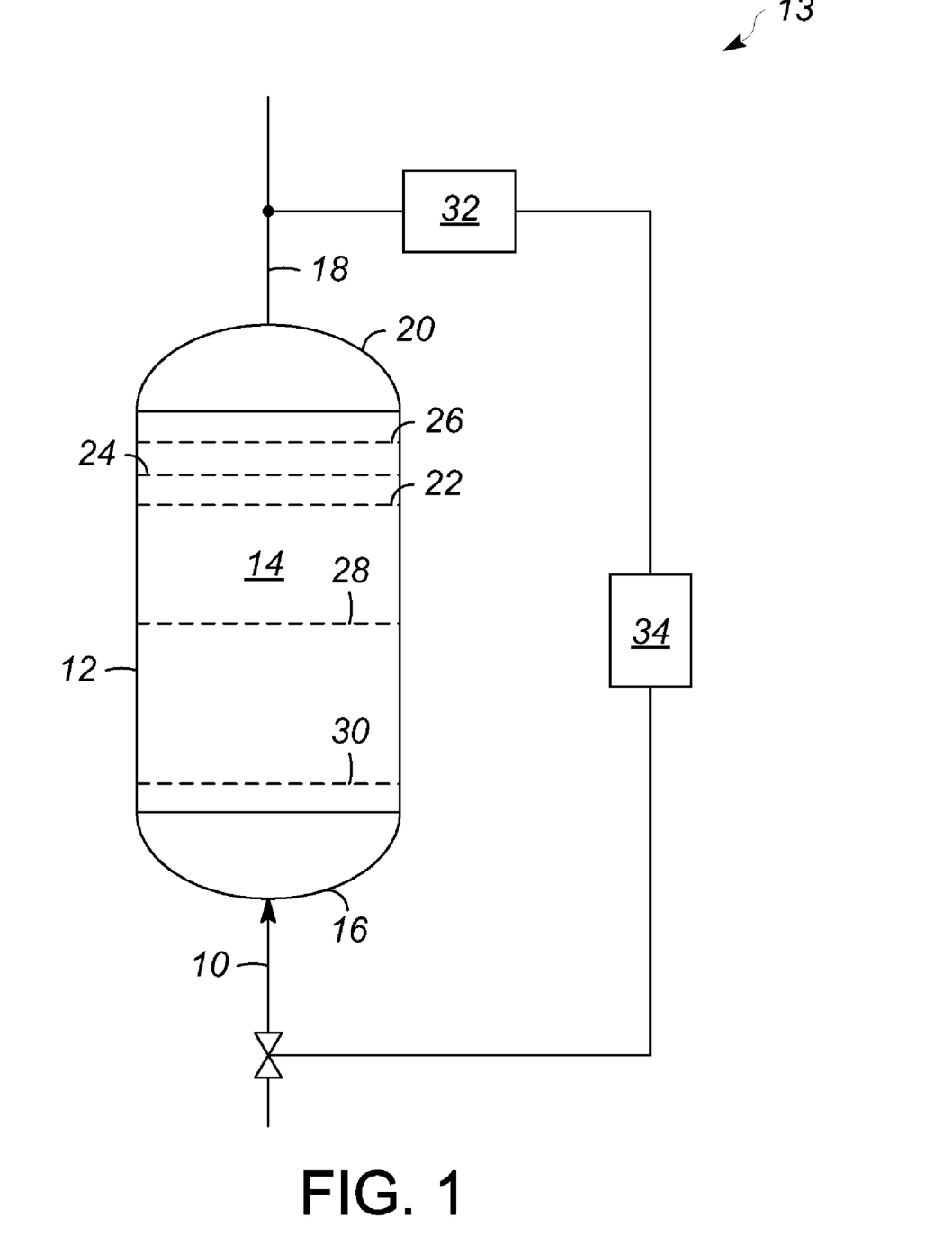
FIG. 1 schematically illustrates an adsorption unit of a pressure swing adsorption system in accordance with an exemplary embodiment.

Referring to FIG. 1, a schematic depiction of an adsorption unit 12 of a multi-adsorption unit PSA system 13 in accordance with an exemplary embodiment is provided. The PSA system 13 operates essentially as an adiabatic process for separating a multicomponent feed gas stream 10 comprising an admixture of impurities and product gas. For example, the feed gas stream 10 may be a hydrogen rich gas stream or a synthesis gas stream from a refinery process, steam reforming process, hydrocracking process, natural gas process, or the like, with impurities, such as, carbon dioxide, carbon monoxide, nitrogen, argon, light hydrocarbons (e.g. with a carbon number ranging from 1 to 12), water vapor, hydrogen sulfide, ammonia, COS, and/or the like.

In an exemplary embodiment, the PSA process comprises an adsorption step where the feed gas stream 10 is fluidly communicated to the adsorption unit 12. The adsorption unit 12 contains a fixed-bed 14 of adsorbent. The adsorbent is effective to selectively adsorb the impurities from the feed gas stream 10. Some nonlimiting examples of adsorbent are silica gels, activated carbon, activated alumina, zeolite, and molecular sieve materials. Preferably, the adsorbent has a highly porous microstructure that gives it a very high specific surface area that allows the gaseous impurities to be adsorbed onto the surfaces of the adsorbent at high-pressure, and at low pressure the impurities desorb from the surfaces of the adsorbent and return back into a gaseous phase. In an exemplary embodiment, the adsorbent comprises various adsorbent materials that are arranged in layers in the fixed-bed 14 of the adsorption unit 12 according to their adsorption strength. In an exemplary embodiment, the lower layers of the fixed-bed 14 contain weakly adsorbent materials, such as, activated alumina and/or silica gel, while the intermediate layers contain intermediate strength adsorbent materials, such as, activated carbon, and the upper layers contain strong adsorbent materials, such as, zeolite and/or molecular sieve materials.

The fixed-bed 14 contains voids because of the packing of the adsorbent. The feed gas stream 10 is introduced into the adsorption unit 12 at an inlet end 16 at a first elevated pressure. In an exemplary embodiment, the first elevated pressure is from about 15 to about 25 bar. The feed gas stream 10 works its way through the voids of the adsorbent and the impurities are adsorbed onto the adsorbent. A high purity product stream (e.g. impurity-depleted product stream) flowing through a line 18 is discharged from a discharge end 20 of the adsorption unit 12.

As the feed gas stream 10 continues to be fluidly communicated to the fixed-bed 14, an impurity adsorption front is established at the inlet end 16 of the adsorption unit 12 and progressively moves longitudinally through the adsorption unit 12 toward the discharge end 20 to a predetermined level 22 within the fixed-bed 14. The introduction of the feed gas stream 10 is then terminated to complete the adsorption step.

At least a portion of the product gas still trapped in the voids of the adsorbent is then removed through the discharge end 20 of the adsorption unit 12 through line 18 by co-currently depressurizing the adsorption unit 12 from the first elevated pressure to a lower but still elevated pressure. An exemplary embodiment, the lower but still elevated pressure is from about 3 to about 15 bar. This co-current depressurization step causes the impurity adsorption front to advance toward the discharge end 20 of the bed 14 to a new level 26. Preferably, one or more intermediate steps may be used during the co-current depressurization step to move the impurity adsorption front to level 24, with the final stage of the co-current depressurization step advancing the impurity adsorption front to level 26. As will be discussed in further detail below, the PSA system 13 is configured as a multi-bed system (see FIG. 2). When the multi-bed system is operating in a normal mode, the co-current depressurization step includes at least one depressurizing equalization step and a providing purge step for equalizing pressure with a second adsorption unit and providing gas to purge the fix-bed of a third adsorption unit undergoing regeneration, respectively.

In an exemplary embodiment, a sensing arrangement 32 for sensing a physical characteristic of a gas is suitably positioned to sample the gas (e.g. PSA effluent) flowing through line 18. A control unit 34 is cooperatively configured with the sensing arrangement 32 for analyzing the physical characteristics sensed by the sensing arrangement 32 and for directing the PSA process to operate in either the normal mode or a high purge mode as will be discussed in further detail below. The control unit 34 is capable of performing any necessary control comparisons and/or calculations in order to determine the level of one or more of the impurities in the gas stream flowing through line 18. In one example, the sensing arrangement 32 is a gas analyzer, such as, an infrared analyzer that can measure the concentration of impurities, such as carbon monoxide or methane, in a high purity stream, such as a hydrogen-rich stream. In another example, the sensing arrangement 32 can measure the thermal conductivity of the gas stream and the control unit 34 can analyze the measured thermal conductivity to determine the level of one or more different impurities, such as nitrogen, in the gas stream. As illustrated, the sensing arrangement 32 can be used for sampling either or both the co-current depressurization effluent and/or the final product effluent.

Following the co-current depressurization step, the adsorption unit 12 is further depressurized counter-currently toward the direction of the inlet end 16 to define the counter-current depressurization step (or blowdown step). Preferably, this step brings the impurity adsorption front in the fixed-bed 14 to level 28. The fixed-bed 14 is then purged during the purge step with a co-current depressurization effluent and/or a high purity product stream from another adsorption unit to bring the impurity adsorption front to level 30. Finally, the adsorption unit 12 is repressurized with product or feed gas during the repressurization step in preparation for the next adsorption step. As will be discussed in further detail below, when the multi-bed system 13 is operating in a normal mode, the repressurization step includes at least one pressurizing equalization step and a product or feed repressurization step for repressurizing the adsorption unit 12.

Figure 2:
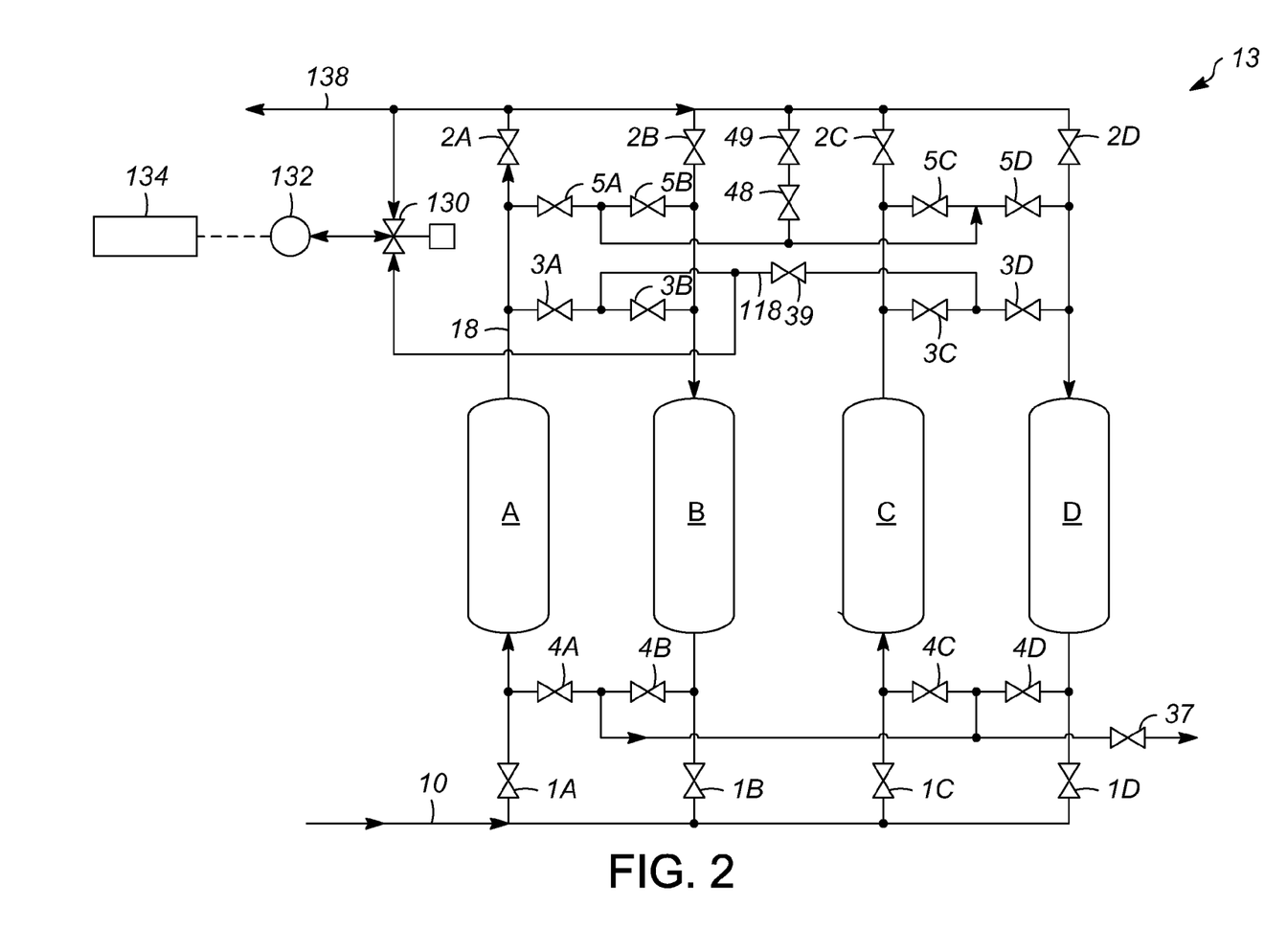
FIG. 2 schematically illustrates a pressure swing adsorption system in accordance with an exemplary embodiment.

Referring to FIGS. 2-6, an exemplary embodiment of the PSA process is provided. FIG. 2, illustrates the PSA system 13 comprising a four-adsorption unit arrangement including an adsorption unit A, an adsorption unit B, an adsorption unit C, and an adsorption unit D that are in selective fluid communication with each other via a plurality of valves. While the PSA system 13 is depicted having a four-adsorption unit arrangement, it will be appreciated that the multi-adsorption unit arrangement may include three adsorption units or more than four adsorption units. Preferably each of the adsorption units A-D have a lower layer or lower layers of weakly adsorbing adsorbent, such as, activated alumina or silica gel, and an upper layer or upper layers of more strongly adsorbing adsorbent, such as, activated carbon, molecular sieves and/or zeolite. Each of the adsorption units A-D undergoes each of the noted steps of the PSA process in a staggered sequence. In particular, each of the adsorption units A-D adsorb impurities onto adsorbent and regenerate the adsorbent following the sequence of an adsorption step, a co-current depressurization step, a counter-current depressurization step, a purge step, and a repressurization step as will be discussed in further detail below.

Figure 3:
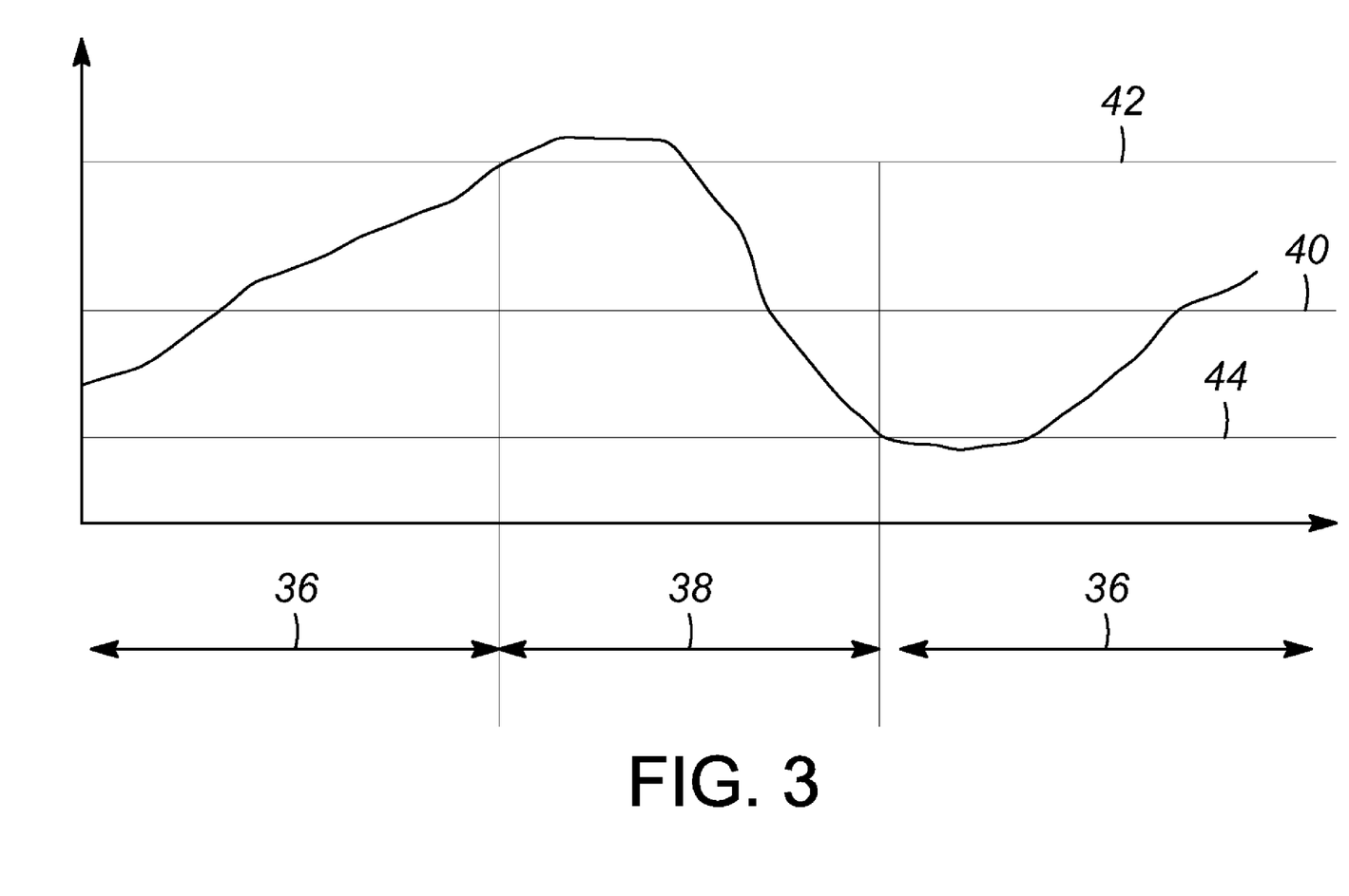
FIG. 3 graphically illustrates the impurity level of a pressure swing adsorption effluent produced during the pressure swing adsorption process operating in a normal mode and a high purge mode in accordance with an exemplary embodiment.

FIG. 3 is a graphical depiction of the impurity levels measured in an effluent from the PSA process operating in a normal mode 36 and a high purge mode 38 in accordance with an exemplary embodiment. The PSA process is configured to remove impurities to produce an effluent at or below a targeted low-impurity level 40 while operating in the normal mode 36. However, if the impurity level in the effluent increases such that the impurity level reaches a predetermined upper impurity level 42, the PSA process will respond by operating in the high purge mode 38 until the impurity level decreases to a predetermined lower impurity level 44. When the predetermined lower impurity level 44 has been reached, the PSA process responds by operating in the normal mode 36.

Figure 4:
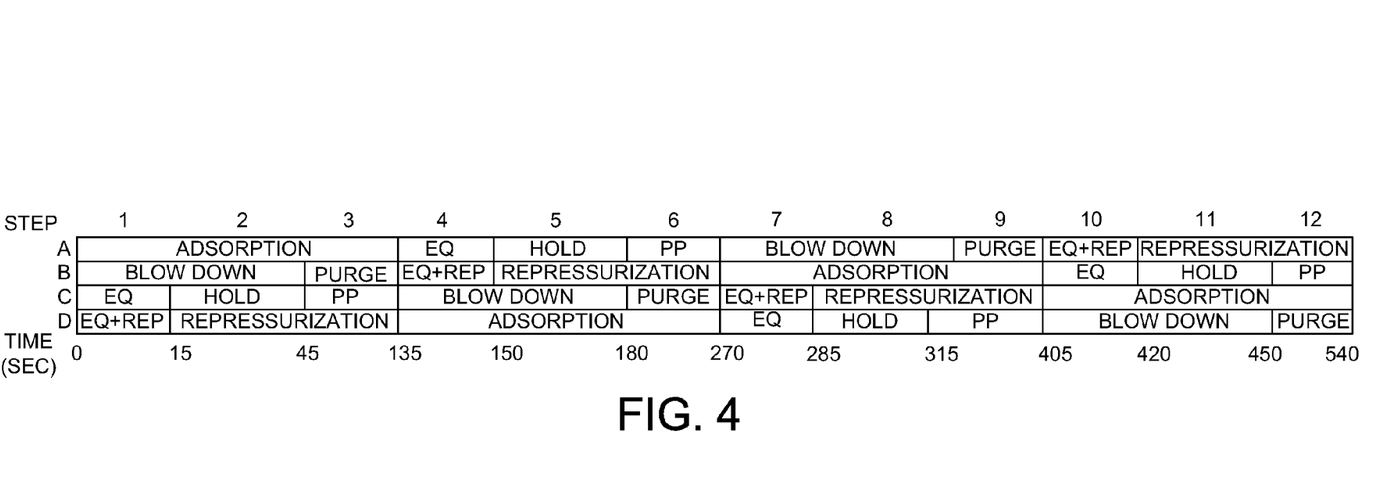
FIG. 4 is a chart representing the pressure swing adsorption sequences for the pressure swing adsorption system depicted in FIG. 2 operating in a normal mode in accordance with an exemplary embodiment.

FIG. 4 is a chart showing the PSA process steps in the staggered sequence for each of the adsorption units A-D for the PSA process operating in the normal mode in accordance with an exemplary embodiment. FIG. 4 is based on a 9-minute cycle time broken into 12 time periods. The cycle time is defined as the time that is required for all four adsorption units A-D to go through a complete cycle of adsorption and regeneration. While a 9-minute cycle time is shown, it will be appreciated that the cycle time can be less than 9 minutes or greater than 9 minutes. Also, the number of time periods is not limited to 9 time periods and may change, such as, for example, depending upon the number of adsorption units being used in the PSA process. For instance, a 5-adsorption unit arrangement may use 15 time periods for a given cycle time while a 6-adsorption unit arrangement may use 18 time periods for a given cycle time. As illustrated, the normal mode for each of the adsorption units A-D includes (1) an adsorption step (e.g. ADSORPTION), (2) a co-current depressurization step comprising a depressurizing equalization step, a hold step, and a providing purge step (e.g. EQ, HOLD, PP, respectively), (3) a counter-current depressurization step (e.g. BLOW DOWN), (4) a purge step (e.g. PURGE), and (5) a repressurization step comprising a pressurizing equalization step and a product or feed repressurization step (e.g. EQ+REP, REPRESSURIZATION, respectively).

Figure 5:
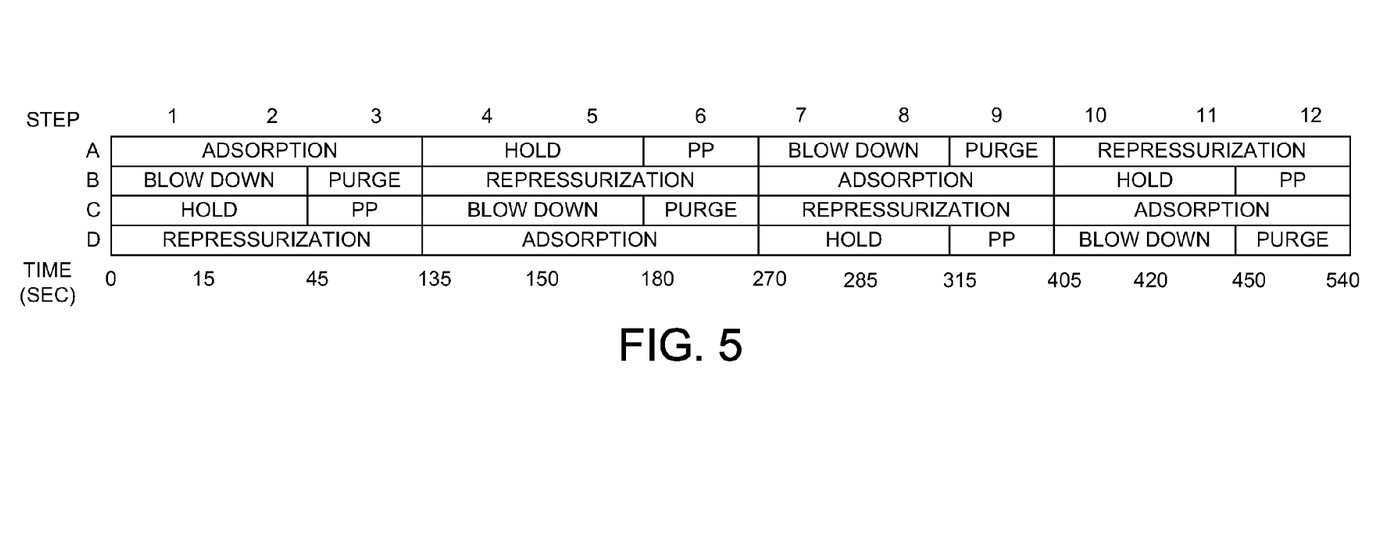
FIG. 5 is a chart representing the pressure swing adsorption sequences for the pressure swing adsorption system depicted in FIG. 2 operating in a high purge mode in accordance with an exemplary embodiment.

FIG. 5 is a chart showing the PSA process steps in the staggered sequence for each of the adsorption units A-D for the PSA process operating in the high purge mode in accordance with an exemplary embodiment. FIG. 5 is also based on a 9-minute cycle time broken into 12 time periods but other cycle times and number of time periods may be used. As illustrated, the high purge mode for each of the adsorption units A-D includes (1) an adsorption step (e.g. ADSORPTION), (2) a co-current depressurization step comprising a hold step or steps and a providing purge step (e.g. HOLD, PP, respectively), (3) a counter-current depressurization step (e.g. BLOW DOWN), (4) a purge step (e.g. PURGE), and (5) a repressurization step comprising a product or feed repressurization step or steps (e.g. REPRESSURIZATION).

Figure 6:
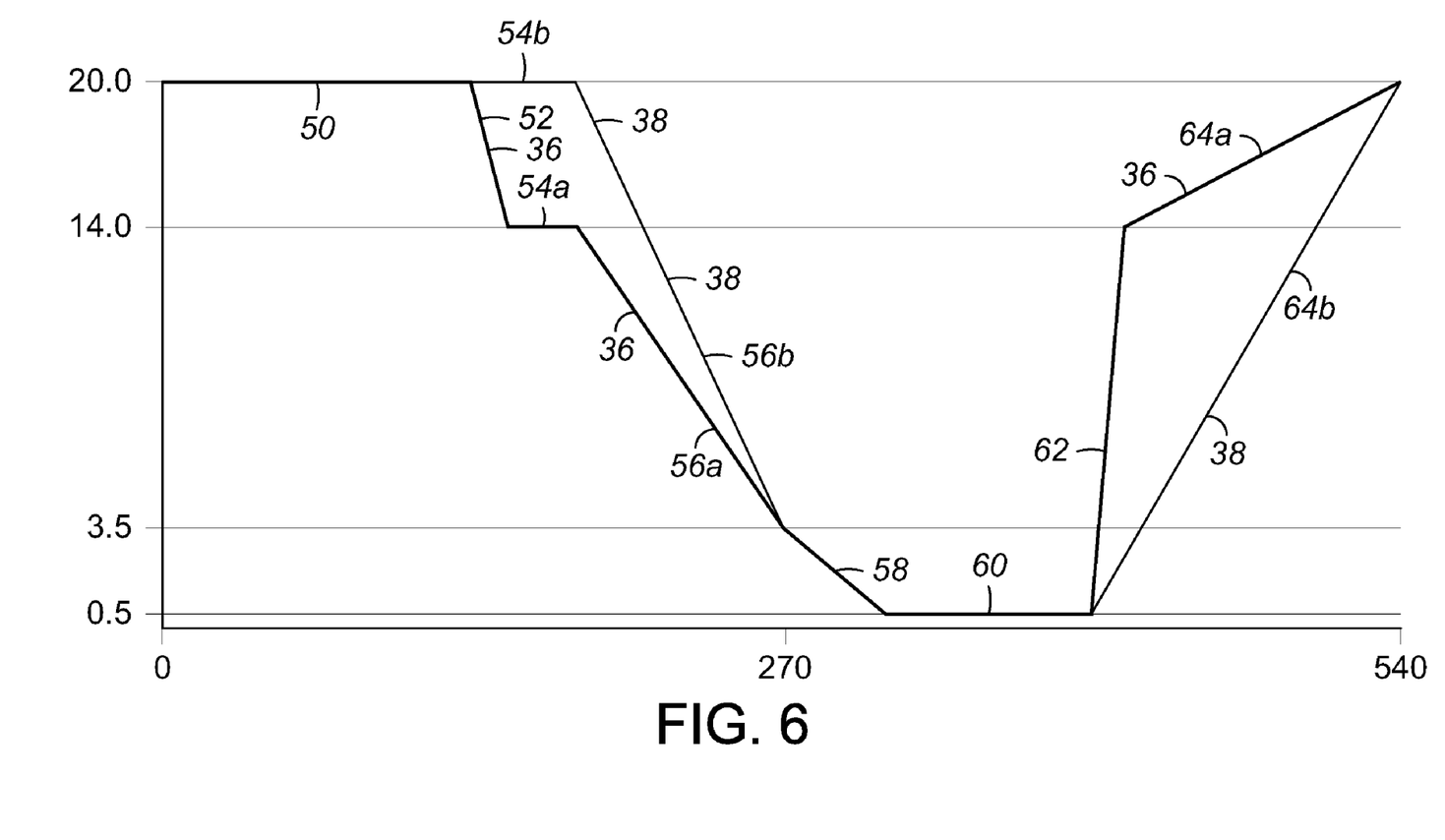
FIG. 6 graphically represents the pressure swing adsorption sequence for an adsorption unit depicted in FIG. 2 as a function of pressure and time for both a normal mode and a high purge mode in accordance with an exemplary embodiment.

FIG. 6 is a graphical representation of pressure versus time for each step in the PSA cycle for the adsorption unit A in both the normal mode depicted in FIG. 4 and the high purge mode depicted in FIG. 5. The y-axis is the pressure in bar and the x-axis is the time in seconds.

Referring to FIGS. 2-4 and 6, the PSA system 13 operating in the normal mode 36 in accordance with an exemplary embodiment will be described. In the following description, unless the valves are indicated as being open, they are closed.

Time Period 1:

The valves 1A and 2A are simultaneously opened to begin the adsorption step (see FIG. 4 "ADSORPTION" and FIG. 6 at 50) in the adsorption unit A while valves 1C and 2C are closed to stop the adsorption step in the adsorption unit C. During the adsorption step, the feed gas stream 10 enters the adsorption unit A at the inlet end and impurities are adsorbed onto the adsorbent contained therein to produce a high purity product stream 18 that is removed at the discharge end of the adsorption unit A and fluidly communicated to a manifold 138. The valves 4B and 37 open to begin the counter-current depressurization step (e.g. counter-currently means gas moves and exits the adsorption unit in the opposite direction as the feed and product gases move during the adsorption step) or blowdown (see FIG. 4 "BLOW DOWN") of the adsorption unit B. During blowdown, the adsorption unit B is depressurized out of the bottom of the vessel (counter-currently) through the valves 4B and 37 to waste stream pressure. Impurities are desorbed and vented, and the adsorption impurity front drops to about level 28 in FIG. 1. The valves 5C and 5D are opened to begin pressure equalization from the adsorption unit C, which is undergoing the depressurizing equalization step (see FIG. 4 "EQ"), to the adsorption unit D, which is undergoing the pressurizing equalization step (see FIG. 4 "EQ+REP"). During pressure equalization, the adsorption unit C is depressurized co-currently (e.g. co-currently means gas moves and exits the adsorption unit C in the same direction as the feed and product gases move during the adsorption step) through valve 5C to an intermediate pressure. The gas released from the adsorption unit C flows directly to the adsorption unit D that is undergoing repressurization to provide gas for partial repressurization of the adsorption unit D. The impurity adsorption front advances during this step in the adsorption unit C, e.g., to a degree represented as level 24 in FIG. 1. During the repressurization step in general, the particular adsorption unit A, B, C or D undergoing repressurization is repressurized to the adsorption pressure in two stages: (1) pressure equalization gas and optionally product gas enter the top of the adsorption unit through valve 5 of the adsorption unit being repressurized as described above; and (2) after the pressure equalization is completed, repressurization is continued with product gas only through valve 5 of the adsorption unit that is being repressurized. The final portion of repressurization ends when the adsorption unit switches to the adsorption step. In one example, part of the product flow is diverted from adsorption unit A through valves 49, 48, and 5D for repressurization of adsorption unit D. In an alternative embodiment, instead of using product gas for the repressurization, feed gas can also be used. In this embodiment, the gas would enter from valve 1A while valves 49, 48, and 5D would remain closed. In yet another alternative embodiment, product repressurization can also be achieved by keeping valves 5D, 49, and 48 and closed positions in opening valve 2D and diverting flow from the product line 138. Blowdown of adsorption unit B can be controlled with valve 4B without the presence about 37.

Time Period 2:

The adsorption unit A continues the adsorption step (see FIG. 6 at 50) and the adsorption unit B continues the blowdown step. The valve 5C closes, ending pressure equalization between the adsorption units C and D. The adsorption unit C remains in a hold condition (see FIG. 4 "HOLD"), e.g., hold step, where valves 1C-5C are closed through the rest of the time period. The adsorption unit D discontinues the pressurizing equalization step and begins the product repressurization step (see FIG. 4 "REPRESSURIZATION").

Time Period 3:

The adsorption unit A continues the adsorption step (see FIG. 6 at 50) and the adsorption unit D continues the product repressurization step. The adsorption unit B is purged (see FIG. 4 "PURGE"), e.g., purge step, by the effluent from the last stage of co-current depressurization step of the adsorption unit C. The adsorption unit C provides a high purity gas (providing purge step—see FIG. 4 "PP") through valves 3C, 39, and 3B. The high purity gas purges adsorption unit B and flows out, together with desorbed impurities, through valves 4B and 37. The providing purge step stops when the termination pressure for co-current depressurization is reached. During this step, the adsorption impurity front advances towards the top of the depressurizing adsorption unit (e.g., level 26 in FIG. 1). In an alternative embodiment, the providing purge step can be controlled by valves 3C and 3B without the presence of valve 39.

Time Period 4:

The valves 1D and 2D simultaneously open to begin the adsorption step in the adsorption unit D while the valves 1A and 2A are closed to stop the adsorption step in the adsorption unit A. The valves 5A and 5B open to begin the pressure equalization step from the adsorption unit A, which is undergoing the depressurizing equalization step (see FIG. 6 at 52), to the adsorption unit B, which is undergoing the pressurizing equalization step. Part of the product flow is diverted through the valves 49, 48, and 5B for product repressurization of the adsorption unit B. The valves 4C and 37 are opened to begin the blowdown step of the adsorption unit C.

Time Period 5:

The adsorption unit D continues the adsorption step and the adsorption unit C continues the blowdown step. The valve 5A closes, ending pressure equalization between the adsorption units A and B. The adsorption unit A remains in a hold condition (e.g. hold step, see FIG. 6 at 54*a*) through the rest of the time period. The adsorption unit B continues product repressurization.

Time Period 6:

The adsorption unit D continues the adsorption step and the adsorption unit B continues the product repressurization step. The adsorption unit C is purged by the effluent from co-current depressurization of the adsorption unit A. The adsorption unit A provides high purity gas (e.g. providing purge step, see FIG. 6 at 56*a*) through the valves 3A, 39, and 3C. The high purity gas purges the adsorption unit C and flows out through the valves 4C and 37. The adsorption unit A provides purge gas until the pressure drops to the co-current termination pressure.

Time Period 7:

The valves 1B and 2B simultaneously open to begin the adsorption step in the adsorption unit B while the valves 1D and 2D close to stop the adsorption step in the adsorption unit D. The valves 5C and 5D open to begin pressure equalization from the adsorption unit D to the adsorption unit C. Part of the product flow is diverted through the valves 49, 48, and 5C for product repressurization of the adsorption unit C. The valves 4A and 37 open to begin the blowdown step (see FIG. 6 at 58) of the adsorption unit A.

Time Period 8:

The adsorption unit B continues the adsorption step and the adsorption unit A continues the blowdown step (see FIG. 6 at 58). The valve 5D closes, ending pressure equalization between the adsorption units D and C. The adsorption unit C continues product repressurization. The adsorption unit D remains in a hold condition through the rest of the time period.

Time Period 9:

The adsorption unit B continues the adsorption step and the adsorption unit C continues the product repressurization step. The adsorption unit A is purged (e.g. purge step, see FIG. 6 at 60) by the adsorption unit D. The adsorption unit D provides high purity gas through the valves 3D, 39, and 3A. The high purity gas purges the adsorption unit A and flows out through the valves 4A and 37. The adsorption unit D provides purge gas until the pressure drops to the co-current termination pressure.

Time Period 10:

The valves 1C and 2C simultaneously open to begin the adsorption step in the adsorption unit C while the valves 1B and 2B close to stop the adsorption step in the adsorption unit B. The valves 5A and 5B open to begin pressure equalization from the adsorption unit B, which is undergoing the depressurizing equalization step, to the adsorption unit A, which is undergoing the pressurizing equalization step (see FIG. 6 at 62). Part of the product flow is diverted through the valves 49, 48, and 5A for product repressurization of the adsorption unit A. The valves 4D and 37 open to begin the blowdown step of the adsorption unit D.

Time Period 11:

The adsorption unit C continues the adsorption step and the adsorption unit D continues the blowdown step. The valve 5B closes, ending pressure equalization between the adsorption units B and A. The adsorption unit B remains in a hold condition through the rest of the time period. The adsorption unit A continues product repressurization (see FIG. 6 at 64*a*).

Time Period 12:

The adsorption unit C continues the adsorption step and the adsorption unit A continues the product pressurization step (see FIG. 6 at 64*a*). The adsorption unit D is purged by the adsorption unit B. The adsorption unit B provides high purity gas through the valves 3B, 39, and 3D. The high purity gas purges the adsorption unit D and flows out through the valves 4D and 37. The adsorption unit B provides purge gas until the pressure drops to the co-current termination pressure. At the end of time period 12, the PSA system 13 returns to time period 1 and the cycle is repeated.

Referring to FIGS. 2-4, during any one or more of the time periods 1-12 in the normal operating mode 36, the sensing arrangement 132 receives a PSA effluent through a 3 way valve 130. In one embodiment, the PSA effluent is co-current depressurization gas that is passed through the 3-way valve 130 from a line 118. In another embodiment, the PSA effluent is product gas that is passed through the 3-way valve 130 from the manifold 138. The impurity level is measured by the sensing arrangement 132 and transmitted to the control unit 134. In an exemplary embodiment, the control unit 134 compares the measured impurity level to the targeted low-impurity level 40. If the measured impurity level is equal to or greater than the targeted low-impurity level 40 plus a predetermined upper end tolerance, e.g., about 10%, corresponding to the predetermined upper impurity level 42, then the PSA process begins operating in the high purge mode 38. In an exemplary embodiment, the PSA process continues to operate in the high purge mode 38 and the sensing arrangement 132 continues to sample the PSA effluent until the measured impurity level is equal to or less than the targeted low-impurity level 40 minus a predetermined lower end tolerance, e.g. about 10%, corresponding to a predetermined lower impurity level 40. When this occurs, the PSA process responds by returning to operating in the normal mode 36.

Referring to FIGS. 2-3 and 5-6, the PSA system 13 operating in the high purge mode 38 in accordance with an exemplary embodiment will be described. In the following description, many of the PSA process steps and corresponding valve positions are the same as described above for the corresponding time periods of the PSA process operating in the normal mode 36 and unless indicated otherwise, the descriptions of such have either been redacted or omitted for brevity.

Time Period 1:

The adsorption step (see FIG. 6 at 50) begins in the adsorption unit A. The valve 5C remains closed and the valve 5D is opened to begin the hold step in the adsorption unit C and the product repressurization step in the adsorption unit D instead of the depressurizing equalization step and the pressure equalization step, respectively for the adsorption units C and D, otherwise conducted during the normal mode 36. The gas that would otherwise be released from the adsorption unit C to the adsorption unit D during the normal mode 36 remains in the adsorption unit C as additional purging gas for the subsequent providing purge and purge steps. The adsorption unit B begins the blowdown step.

Time Period 2:

The adsorption units A and B continue the adsorption step (see FIG. 6 at 50) and the blowdown step, respectively. Also, the adsorption units C and D continue the hold step and the product repressurization step, respectively.

Time Period 3:

The adsorption units A and D continue the adsorption step (see FIG. 6 at 50) and the product repressurization step, respectively. The adsorption unit B begins the purge step with the high purity effluent from the adsorption unit C that is beginning the providing purge step. In particular, adsorption unit C contains additional purging gas resulting from the hold step conducted during Time Period 1 as described above. The additional purging gas enhances removal of the impurities adsorbed on the adsorbent contained in adsorption unit B, reducing and/or controlling impurity buildup on the adsorbent and reducing the impurity level (e.g. reduce the impurities) of the PSA effluent.

Time Period 4:

The adsorption step begins in the adsorption unit D. The valve 5A remains closed to begin the hold step in the adsorption unit A (FIG. 6 at 54b), instead of the depressurizing equalization step otherwise conducted during the normal mode 36, to retain additional purging gas in the adsorption unit A for the subsequent providing purge and purge steps. Also, the valve 5B is opened to begin the product repressurization step in the adsorption unit B, instead of the pressure equalization step otherwise conducted during the normal mode 36. The adsorption unit C begins the blowdown step.

Time Period 5:

The adsorption unit D continues the adsorption step and the adsorption unit C continues the blowdown step. The adsorption unit A remains in the hold condition (e.g. hold step, see FIG. 6 at 54b) and the adsorption unit B continues the product repressurization step.

Time Period 6:

The adsorption unit D continues the adsorption step and the adsorption unit B continues the product repressurization step. The adsorption unit A provides high purity gas (e.g. providing purge step, see FIG. 6 at 56b), including the additional purging gas retained in the adsorption unit A during Time Period 4 as discussed above, to purge the adsorption unit C (e.g. purge step). The additional purging gas enhances removal of the impurities adsorbed on the adsorbent contained in adsorption unit C, reducing and/or controlling impurity buildup on the adsorbent and reducing the impurity level of the PSA effluent.

Time Period 7:

The adsorption step begins in the adsorption unit B. The valve 5C remains closed and the valve 5D opens to begin the hold step in the adsorption unit D, which retains additional purging gas therein for the subsequent providing purge and purge steps, and to begin the product repressurization step in the adsorption unit C. The blowdown step (see FIG. 6 at 58) begins in the adsorption unit A.

Time Period 8:

The adsorption unit B continues the adsorption step and the adsorption unit A continues the blowdown step (see FIG. 6 at 58). The adsorption unit D continues the hold step and the adsorption unit C continues the product repressurization step.

Time Period 9:

The adsorption unit B continues the adsorption step and the adsorption unit C continues the product repressurization step. The adsorption unit A is purged (e.g. purge step, see FIG. 6 at 60) with high purity gas including the additional purging gas from the adsorption unit D (e.g. providing purge step) to control impurity buildup on the adsorbent and reduce the impurity level in the PSA effluent as discussed above.

Time Period 10:

The adsorption step begins in the adsorption unit C. The valve 5A remains closed and the valve 5B opens to begin the hold step in adsorption unit B, which retains additional purging gas therein for the subsequent providing purge and purge steps, and the product repressurization step in the adsorption unit A (see FIG. 6 at 64b). The blowdown step begins in the adsorption unit D.

Time Period 11:

The adsorption unit C continues the adsorption step and the adsorption unit D continues the blowdown step. The adsorption unit B continues in the hold step and the adsorption unit A continues the product repressurization step (see FIG. 6 at 64b).

Time Period 12:

The adsorption unit C continues the adsorption step and the adsorption unit A continues the product pressurization step (see FIG. 6 at 64b). The adsorption unit D is purged (e.g. purge step) with high purity gas including the additional purging gas from the adsorption unit B (e.g. providing purge step) to control impurity buildup on the adsorbent and reduce the impurity level in the PSA effluent as described above. At the end of time period 12, the PSA system 13 returns to time period 1 and the cycle is repeated until the impurity level measured in the PSA effluent reaches the predetermined lower impurity level 44 illustrated in FIG. 3.

Accordingly, methods for controlling impurity buildup on adsorbent for PSA processes have been described. The various embodiments comprise using adsorbent that is contained in a plurality of adsorption units including a first adsorption unit, a second adsorption unit, and a third adsorption unit. The adsorption units cooperatively operate in a staggered sequence comprising an adsorption step, a co-current depressurization step, a counter-current depressurization step, a purge step, and a repressurization step. The adsorption step is for adsorbing at least one selectively-adsorbable impurity from the multicomponent feed stream at a high-pressure onto the adsorbent to form a high purity product stream. The depressurization and purge steps are for depressurizing and purging the adsorption unit to remove the impurities from the adsorbent and to regenerate the adsorbent. The repressurization step is for repressurizing the adsorption units for the next adsorption step.

When the PSA process is operating in a normal mode, the process preferably produces a high purity product gas near or below its targeted low-impurity level during the adsorption step. The subsequent co-current depressurization step comprises at least one depressurizing equalization step and a providing purge step. In particular, the depressurizing equalization step causes an amount of gas that is essentially high purity product gas to be fluidly communicated from the first adsorption unit that is at a pressurized condition to the second adsorption unit, which is at a lower pressure, to equalize pressure between the first and second adsorption units. The providing purge step causes a second amount of gas that is essentially high purity product gas to be fluidly communicated from the first adsorption unit to the third adsorption unit, which is currently undergoing the purge step, to purge impurities from the adsorbent in the third adsorption unit.

In an exemplary embodiment, the impurities in an effluent from the PSA process are measured either continuously or repeatedly using a purity analyzer (e.g. a sensing arrangement cooperatively configured with a control unit). The effluent may be the product gas stream, or more preferably a depressurization gas stream from one or more of the co-current depressurizing steps. If the impurities in the effluent have reached a predetermined upper impurity level that is greater than the targeted low-impurity level, then the PSA process responds by changing to a high purge mode. In the high purge mode, the PSA process still operates using the staggered sequence comprising an adsorption step, a co-current depressurization step, a counter-current depressurization step, a purge step, and a repressurization step. However, the co-current depressurization step is modified by excluding at least one depressurization equalization step. As such, the amount of high purity gas that would otherwise be fluidly communicated in the normal mode from the first adsorption unit at a high-pressure to the second adsorption unit at a lower pressure remains in the first adsorption unit as additional high purity purging gas, and preferably to maintain the high pressure therein. Thus, when the first adsorption unit advances to the providing purge step, more high purity gas is available in the first adsorption unit for being fluidly communicated to purge the third adsorption unit. Using more high purity gas to purge the third adsorption unit enhances removing the impurities that may be built up on the adsorbent. It should also be noted that in addition to high purity gas taken from the co-current depressurization step, additionally a slip stream of the product gas from the adsorption step can be used as well to increase the purging of an absorber. In an exemplary embodiment, when the measured impurities in the effluent have reached a predetermined lower impurity level that is less than the targeted low-impurity level, the PSA process responds by changing from operating in the high purge mode to operating in the normal mode.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention, it being understood that various changes may be made in the function and arrangement of elements described in an exemplary embodiment without departing from the scope of the invention as set forth in the appended Claims and their legal equivalents.

What is claimed is:

1. A method for controlling impurity buildup on adsorbent for a pressure swing adsorption (PSA) process, the adsorbent is contained in a plurality of adsorption units including a first adsorption unit, a second adsorption unit, and a third adsorption unit, the method comprising the steps of:
   operating the PSA process in a normal mode comprising a first depressurizing equalization step and a providing purge step, the first depressurizing equalization step causing a first amount of gas to be fluidly communicated from the first adsorption unit that is at a pressurized condition to the second adsorption unit to equalize pressure between the first and second adsorption units, and the providing purge step causing a second amount of gas to be fluidly communicated from the first adsorption unit to purge the third adsorption unit for removal of impurities from the adsorbent in the third adsorption unit;
   sensing the impurities in an effluent from the PSA process; and
   operating the PSA process in a high purge mode comprising a high providing purge step and excluding the first depressurizing equalization step to increase an available amount of gas for the high providing purge step, the high providing purge step causing a third amount of gas to be fluidly communicated from the first adsorption unit to purge another of the plurality of adsorption units, wherein the third amount of gas is greater than the second amount of gas for enhanced removal of the impurities from the adsorbent in the another of the plurality of adsorption units.

2. The method according to claim 1, wherein the step of operating the PSA process in the high purge mode includes operating the PSA process such that the high providing purge step causes the third amount of gas to be fluidly communicated from the first adsorption unit to purge the third adsorption unit.

3. The method according to claim 1, wherein the step of operating the PSA process in the high purge mode further comprises excluding the first depressurizing equalization step by replacing the first depressurizing equalization step with a hold step to block fluid communication between the first and second adsorption units.

4. The process according to claim 3, wherein the step of operating the PSA process in the high purge mode includes using the hold step to maintain the first adsorption unit at the pressurized condition.

5. The process according to claim 3, wherein the step of operating the PSA process in the high purge mode includes maintaining the pressurized condition at a pressure established by a prior step during the hold step.

6. The process according to claim 1, wherein the step of operating the PSA process in the high purge mode includes operating the PSA process such that the delivery of the third amount of gas starts at a higher pressure than the delivery of the first amount of gas in the normal operating mode.

7. The process according to claim 1, wherein the step of operating the PSA process in the high purge mode includes operating the PSA process such that the third amount of gas is approximately equal to the first and second amounts of gas combined.

8. The process according to claim 1, wherein the step of operating the PSA process in the high purge mode includes operating the PSA process such that the third amount of gas is larger than the first and second amounts of gas combined via adding a slipstream of product gas.

9. The process according to claim 1, wherein the step of sensing the impurities includes sensing the impurities in the effluent that is a product gas stream formed from the PSA process.

10. The process according to claim 1, wherein the step of sensing the impurities includes sensing the impurities in the effluent that is a co-current depressurization stream from the first adsorption unit formed during the first depressurization equalization step, the providing purge step, or the high providing purge step.

11. The process according to claim 1, wherein the step of operating the PSA process in the normal mode includes a plurality of depressurizing equalization steps including the first depressurizing equalization step and a second depressurizing equalization step.

12. The process according to claim 11, wherein the step of operating the PSA process in the high purge mode includes excluding one or more of the first and second depressurizing equalization steps.

13. The process according to claim 1, wherein the step of sensing the impurities includes measuring the impurities in the effluent continuously or repeatedly until determining that the impurities in the effluent have reached a predetermined upper impurity level, and the step of operating the PSA process in the high purge mode begins in response to determining that the impurities have reached the predetermined upper impurity level.

14. The process according to claim 13, wherein the step of sensing the impurities includes measuring the impurities in the effluent continuously or repeatedly after determining that the impurities have reached the predetermined upper impurity level until determining that the impurities have reached a predetermined lower impurity level, and the step of operating the PSA process and the high purge mode stops in response to determining that the impurities have reached the predetermined lower impurity level.

15. A method for controlling impurity buildup on adsorbent for a pressure swing adsorption (PSA) process, the method comprising the steps of:
operating the PSA process including performing (a) and (b), wherein (a) and (b) are:
(a) a first depressurizing equalization step; and
(b) a providing purge step
sensing impurities in an effluent from the PSA process, wherein if the impurities sensed in the effluent have reached a predetermined upper impurity level, then
operating the PSA process including performing (b) and not (a).

16. The method according to claim 15, wherein the step of operating the PSA process including performing (a) and (b) further includes performing (c) a first pressurizing equalization step and (d) a product or feed pressurization step, and wherein if the impurities sensed in the effluent have reached the predetermined upper impurity level, then the step of operating the PSA process including performing (b) and not (a) further includes performing (d) and not (c).

17. The method according to claim 16, wherein the step of operating the PSA process including performing (a) and (b) further includes performing (e) a second depressurizing equalization step.

18. The method according to claim 17, wherein if the impurities sensed in the effluent having reached the predetermined upper impurity level, then the step of operating PSA process including performing (b) and not (a) further includes not performing (e).

19. The method according to claim 16, wherein the step of operating the PSA process including performing (a) and (b) further includes performing (f) a second pressurizing equalization step.

20. The method according to claim 19, wherein if the impurities sensed in the effluent having reached the predetermined upper impurity level, then the step of operating the PSA process including performing (b) and not (a) includes not performing (f).

21. The method according to claim 19, wherein the step of operating the PSA process including performing (a) and (b) further includes performing (g) any number of additional pressure equalization steps.

22. The method according to claim 21, wherein if the impurities sensed in the effluent having reached the predetermined upper impurity level, then the step of operating PSA process including performing (b) and not (a) includes not performing (g).

23. The method according to claim 21, wherein if the impurities sensed in the effluent having reached the predetermined upper impurity level, then the step of operating the PSA process including performing (b) and not (a) includes not performing (g) but including the use of a slipstream of product gas as additional high purity gas for increased purging.

24. A method for controlling impurity buildup on adsorbent for a pressure swing adsorption (PSA) process, the method comprising the steps of:
operating the PSA process in a normal mode comprising:
causing a first amount of gas to be fluidly communicated from a first adsorption unit to a second adsorption unit to equalize pressure between the first and second adsorption units in one or more pressure equalization steps; and
causing a second amount of gas to be fluidly communicated from the first adsorption unit to a third adsorption unit for purging impurities from the adsorbent in the third adsorption unit;
sensing impurities in an effluent from the PSA process, wherein if the impurities sensed in the effluent have reached a predetermined upper impurity level, then
operating the PSA process in a high rate purge mode comprising:
blocking fluid communication with the first adsorption unit such that the first amount of gas is not or it is not completely fluidly communicated from the first adsorption unit to equalize pressure with the second adsorption unit through a reduction in the number of the pressure equalization steps; and
causing a third amount of gas to be fluidly communicated from the first adsorption unit to the third or a fourth absorption unit, wherein the third amount of gas is greater than the second amount of gas for enhancing purging of the impurities from the adsorbent in the third absorption unit.

* * * * *